United States Patent
Hatori et al.

(10) Patent No.: US 6,885,115 B2
(45) Date of Patent: Apr. 26, 2005

(54) SYSTEM, METHOD AND APPARATUS FOR CONTROLLABLE POWER SUPPLY

(75) Inventors: Masahiko Hatori, Ebina (JP); Toshitsugu Mito, Atsugi (JP)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 10/063,044

(22) Filed: Mar. 14, 2002

(65) Prior Publication Data

US 2002/0140400 A1 Oct. 3, 2002

(30) Foreign Application Priority Data

Mar. 14, 2001 (JP) ........................................ 2001-073071

(51) Int. Cl.[7] .................................................. H02J 1/00
(52) U.S. Cl. ............................ 307/80; 307/66; 700/286; 700/296
(58) Field of Search ..................... 307/66, 80; 700/286, 700/296

(56) References Cited

U.S. PATENT DOCUMENTS

| | | | | |
|---|---|---|---|---|
| 4,168,491 A | * | 9/1979 | Phillips et al. ............... | 340/501 |
| 4,511,979 A | * | 4/1985 | Amirante ..................... | 700/296 |
| 4,573,127 A | * | 2/1986 | Korff ........................... | 700/296 |
| 4,731,547 A | * | 3/1988 | Alenduff et al. .............. | 307/85 |
| 4,851,708 A | * | 7/1989 | Palmer ......................... | 307/141 |
| 4,977,515 A | * | 12/1990 | Rudden et al. ............... | 700/296 |
| 5,038,676 A | * | 8/1991 | Davis et al. .................. | 99/330 |
| 5,500,561 A | * | 3/1996 | Wilhelm ....................... | 307/64 |
| 5,534,734 A | * | 7/1996 | Pugh et al. .................... | 307/38 |
| 5,647,220 A | * | 7/1997 | Kawaguchi et al. ........... | 62/89 |
| 5,721,936 A | * | 2/1998 | Kikinis et al. ............... | 713/323 |
| 5,747,887 A | * | 5/1998 | Takanaga et al. ............. | 307/64 |
| 5,804,894 A | * | 9/1998 | Leeson et al. ............... | 307/130 |
| 5,821,007 A | * | 10/1998 | Harshe et al. ................. | 429/9 |
| 5,909,378 A | * | 6/1999 | De Milleville ............... | 700/276 |
| 6,002,220 A | * | 12/1999 | Takahashi et al. ........... | 318/139 |
| 6,094,926 A | * | 8/2000 | Nakayama et al. ........... | 62/236 |
| 6,194,794 B1 | * | 2/2001 | Lampe et al. ................. | 307/68 |
| 6,223,101 B1 | * | 4/2001 | Sakamoto et al. ........... | 700/276 |
| 6,243,626 B1 | * | 6/2001 | Schanin ....................... | 700/286 |
| 6,304,006 B1 | * | 10/2001 | Jungreis ....................... | 307/64 |
| 6,455,954 B1 | * | 9/2002 | Dailey .......................... | 307/66 |
| 6,465,984 B2 | * | 10/2002 | Fukuoka et al. ............. | 320/112 |
| 6,498,460 B1 | * | 12/2002 | Atkinson ..................... | 320/135 |
| 6,509,717 B2 | * | 1/2003 | Lee .............................. | 320/116 |
| 6,522,031 B2 | * | 2/2003 | Provanzana et al. .......... | 307/48 |
| 6,693,810 B2 | * | 2/2004 | Robinson et al. ............. | 363/97 |

FOREIGN PATENT DOCUMENTS

| | | | | |
|---|---|---|---|---|
| JP | 64-012828 | | 1/1989 | ............. H02J/7/34 |
| JP | 06-137650 | * | 5/1994 | ............. H02J/9/06 |
| JP | 06-301781 | | 10/1994 | ............. G06F/15/70 |
| JP | 08-251830 | | 9/1996 | ............. H02J/7/04 |
| JP | 10-191577 | | 7/1998 | ............. H02J/7/34 |
| JP | 2000-029576 | | 1/2000 | ............. G06F/1/26 |

* cited by examiner

Primary Examiner—Robert L. Deberadinis
(74) Attorney, Agent, or Firm—Joscelyn G. Cockburn

(57) ABSTRACT

A power supply system and a power supply control method capable of having a peak shift function without deteriorating the essential function of an apparatus is provided for such that the present invention provides for the use of the peak shift function without deteriorating the essential function of an electrical apparatus.

22 Claims, 8 Drawing Sheets

SYSTEM, METHOD AND APPARATUS FOR CONTROLLABLE POWER SUPPLY

FIELD OF THE INVENTION

The present invention relates to a power supply system, particularly to a power supply system using a secondary battery and an electrical apparatus using the power supply system.

BACKGROUND OF RELATED ART

Power consumption greatly fluctuates depending on a season and a time zone. For example, power consumption is maximized in summer (from July to September) in which power consumption for air conditioning increases in a year. Moreover, power consumption is maximized in the time zone from 1:00 to 4:00 PM. That is, a power consumption peak lies in a time zone from 1:00 to 4:00 PM in summer (from July to September).

An electric power company sets a power generation capacity on the basis of the power-consumption peak. However, the power generation capacity is surplus except the peak period. In Japan, the load factor to the total power generation capacity averaged through a year ranges between 50 and 60% and the remaining 40 to 50% correspond to the peak period of power consumption. Therefore, it can be said that a sufficient power generation capacity is prepared. Here, the load factor denotes the ratio of annual average power consumption to peak power consumption. To consistently supply power at a low cost, it is preferable that the load factor remain high, often, however, in practice, the load factor tends to lower and the peak demand of power tends to sharpen.

From the above, various apparatuses for shifting the peak period of power consumption (peak shift) or correcting the power consumption peak (peak cut) have been proposed in order to improve a load factor.

For example, one such apparatus is a heat storing air conditioning system. The heat storing air conditioning system produces ice and stores cold heat in the nighttime when power consumption is small and performs the cooling operation in the daytime by using cold heat. More specifically, it has been proposed to perform the cooling operation (peak cut) between 1:00 and 4:00 PM. only by the cold heat stored in the nighttime and perform the combined cooling operation (peak shift) using the cold heat together in a period other than the period between 1:00 and 4:00 PM.

Moreover, it is also known to spread the power source such as in an ECO VENDOR design, for the peak cut period. The ECO VENDOR is a vending machine provided with a peak cut function of automatically stopping a cooling power source in a power consumption peak time zone in summer in order to control the power consumption in the time zone. Moreover, at a domestic level, a home distribution board provided with the peak cut function has been proposed. Some of home distribution boards have a function of monitoring home power consumption, notifying a person of any increase in power consumption by a sound or the like, and turning off a selected power source when power is still consumed.

As described above, under the circumstance in which a load factor lowers, an apparatus provided with the peak shift function or peak cut function (these are hereafter generally referred to as peak shift) plays an important role.

The heat storing airs conditioning system and ECO VENDOR are both apparatuses providing a cooling function. It is therefore desirable to provide the peak shift function of apparatuses that consume power from the viewpoint of environmental problems. It is necessary to note that it is desirable to preserve the essential function of the apparatus concerned, which in general would likely also deteriorate by using the peak shift function. For example, in the case of the ECO VENDOR it is not preferable that a refreshing drink product to be sold be insufficiently cooled by automatically stopping a cooling power source.

SUMMARY OF INVENTION

Therefore, it is an object of the present invention to provide a power supply system and a power supply method allowing an apparatus to have the peak shift function or peak cut function without deteriorating the essential function thereof. It is another object of the present invention to provide an apparatus using the above power supply system and power supply method.

In general, apparatuses such as an air conditioning system and a vending machine use a commercial power source provided by a power company. To perform peak shift, power supply from the commercial power source is stopped or reduced. To compensate the stopped or reduced power, a heat storing air conditioning system uses cold heat (ice) stored through the nighttime. Moreover, certain equipment, such as the ECO VENDOR has a reinforced cold reserving function. Often this function is present since the air conditioning system and vending machine each use "heat" which can be stored, and each system can therefore perform peak shift activity with relative ease. In the case of an apparatus to which power must be supplied at the peak of power consumption, however, it is not easily to add the peak shift function like the case of an air conditioning system and a vending machine because the essential function of the apparatus is deteriorated by stopping or reducing power supply.

In the case of a personal computer (PC) for business or home use, its share of power consumption has been increased because of its high diffusion index. Particularly, in the business field, there are many companies in which one person has one PC. Therefore, to improve the load factor of power consumption, it is preferable to add the peak shift function to a PC. However, the basic operation of a PC is deteriorated by stopping or reducing power supply to the PC.

As is well known, PCs typically include two categories such as the desktop type and notebook type. The notebook type is a PC typically deployed for its portability, and which may also be used on a desk in an office instead of carrying it. However, because there exists an underlying assumption that the use of the notebook is for mobile purposes, often a secondary battery (or secondary cell) such as a nickel metal hydoride battery, lithium ion battery, or lead acid battery is also built in the PC.

A conventional notebook type PC can receive the power of a commercial power source through an AC adapter. In general, while power is received from the commercial power source through the AC adapter, supply of power by a built in secondary battery is stopped. When the capacity of the secondary battery is insufficient, the secondary battery is charged by a commercial power source. Therefore, in an office where power can be supplied from a commercial power source, a notebook type PC is frequently driven by the power supplied from a commercial power source by using an AC adapter. In such a situation, a secondary battery that is fully charged is also actually resting within.

By using the power stored in the resting secondary battery, it is possible to add the peak shift function. In other words, by using a battery capable of storing the electric energy to the extent to show the essential function, it is possible to add the peak shift function to an apparatus. More specifically, by typically stopping or reducing power supply from a commercial power source while receiving the power necessary for operations of an apparatus from a built in battery, it is possible to realize peak shift. Though the typical example is a notebook type PC, the present invention can be also applied to other type of apparatus.

The present invention is based on the above knowledge, which is a power supply system comprising a secondary battery for supplying power to a load circuit, power receiving unit for receiving power externally provided to the load circuit, a switch for selectively supplying the power of the secondary battery or the power externally provided to the load circuit, and a controller for instructing the switch to stop the supply of the power externally provided to the load circuit for a predetermined time zone.

In the case of the power supply system of the present invention, the controller can instruct the switch to stop the supply of the power externally provided to the load circuit even when the source of the power externally provided is electrically connected with the power receiving unit. Moreover, the controller can instruct the switch to supply the power of the secondary battery to the load circuit in the predetermined time zone. In the case of a notebook type PC, even when an AC adapter is connected, supply of the power of a commercial power source to a load circuit is stopped and the power of a built in battery is supplied to the load circuit.

In the case of the power supply system of the present invention, the controller can instruct the switch to supply the power externally provided to the load circuit after the predetermined time zone passes. Therefore, in the case of a notebook PC, when the peak period of power consumption passes, supply of the power of a commercial power source to a load circuit is restarted.

Moreover, the power supply system of the present invention has a battery charger and the controller can instruct the battery charger to charge the secondary battery by using the power externally provided after the predetermined time zone passes.

Moreover, the present invention is a power supply method for selectively supplying the power of a commercial power source or a battery to a load circuit, which comprises the steps of supplying the power of the battery to the load circuit in a predetermined time zone decided in accordance with the power consumption of the commercial power source and supplying the power of the commercial power source to the load circuit in a time zone except the predetermined time zone.

In the case of the power supply method of the present invention, it is preferable to decide the predetermined time zone in accordance with the time zone in which the power consumption of the commercial power source shows a peak in order to realize peak shift. Specifically, the time zone lies in the period between 1:00 and 4:00 PM.

Moreover, the present invention provides an electrical apparatus comprising a device to be operated by the power of a battery or a commercial power source and control unit for controlling whether to preferentially supply the power of the battery or the power of the commercial power source in accordance with a temporal factor.

An electrical apparatus of the present invention controls whether to preferentially supply the power of a battery or the power of a commercial power source to a device in accordance with a temporal factor. As the temporal factor, it is possible to add a peak shift function to an electrical apparatus by using a season and a time for which peak shift is requested.

The electrical apparatus of the present invention further comprises a power receiving unit for receiving the power of an external commercial power source for the device and the control unit can instruct a time zone for supplying the power of the battery to the device preferentially to the power of the commercial power source.

The present invention can be applied to an electrical apparatus having the built in battery, wherein operatively driving the electrical apparatus for peak shift is secured by using the built in battery.

Moreover, the present invention provides an electrical apparatus comprising a device to be operated by receiving power, power receiving unit for receiving the power of an external commercial power source for the device, a first power supply line for supplying the power of the commercial power source received by the power receiving unit to the device, a built in battery for supplying power to the device, a second power supply line for supplying the power of the built in battery to the device, and a switching mechanism for turning off the first power supply line and turning on the second power supply line when the commercial power source is connected to the power receiving unit and a predetermined condition is satisfied.

An electrical apparatus of the present invention is provided with a switching mechanism for turning off the first power supply line and turning on the second power supply line in the time zone in which a predetermined condition such as the power consumption of a commercial power source peaks even when the commercial power source is connected.

Therefore, it is possible to stop the supply of the power of a commercial power source in a season and a time when the power consumption of the commercial power source peaks and this contributes to peak shift. Moreover, during the above period, a second power supply line is turned on, it is possible to supply the power of a built in battery to the device. Therefore, the essential function of an electrical apparatus is not deteriorated.

Moreover, the present invention is an electrical apparatus provided with a device to be operated by the power of a built in battery or a commercial power source, which comprises a switching mechanism for determining whether to supply the power of the built in battery or the power of the commercial power source to the device and a controller for instructing the switching mechanism to supply the power of the built in battery to the device when the remained capacity of the built in battery is equal to or more than a predetermined value and supply the power of the commercial power source to the device when the remained capacity of the built in battery is less than the predetermined value.

An electrical apparatus of the present invention supplies the power of the built in battery to the device when the remained capacity of the built in battery is equal to or more than a predetermined value and supplies the power of the commercial power source to the device when the remained capacity of the built in battery is less than the predetermined value. This is because it is not preferable to supply the power of a built in battery though the remained capacity of the battery is small.

It is preferable that an electrical apparatus of the present invention further comprises a battery charger and the controller instructs the battery charger to charge the built in battery by the power of the commercial power source in any time zone in which the set predetermined time zone passes.

A computer system is a typical example to which an electrical apparatus of the present invention is applied. Particularly, it is preferable to apply an electrical apparatus of the present invention to a portable computer system provided with a built in battery.

Moreover, the present invention provides a power supply method for an electrical apparatus provided with a device to be operated by the power of a built in battery or a commercial power source, in which power is supplied to the device from the built in battery in a first time zone decided in accordance with the power consumption of the commercial power source, power is supplied to the device from the commercial power source in a second time zone except the first time zone, and the built in battery is charged by the commercial power source in the second time zone. The period between 1:00 and 4:00 PM is a typical example of the first time zone.

In the case of a power supply method of the present invention, there are various modes for charging a battery. For example, charging of the built in battery which is charged by the power of the commercial power source in the second time zone can be performed for a predetermined short time after the first time zone passes. In this case, charging will be performed at the maximum charging capacity. It may be requested to quickly charge a notebook type PC after a first time zone passes because the PC has an operation mode in which the PC is carried to a going out destination in order to meet the request.

Moreover, charging of the built in battery by the power of the commercial power source in the second time zone can be also performed by equalized electric energy after the first time zone passes. Though quick charging requires large power consumption, it may not be necessary. When using a notebook type PC on a desk, the above method is an effective charging method.

Furthermore, charging of the built in battery by the power of the commercial power source in the second time zone can be also performed in a time zone in which the power consumption of the commercial power source is small in the second time zone.

DETAILED DESCRIPTION

The present invention is described below in accordance with embodiments although the present invention is not so limited thereto.

First Embodiment

Figure 1:
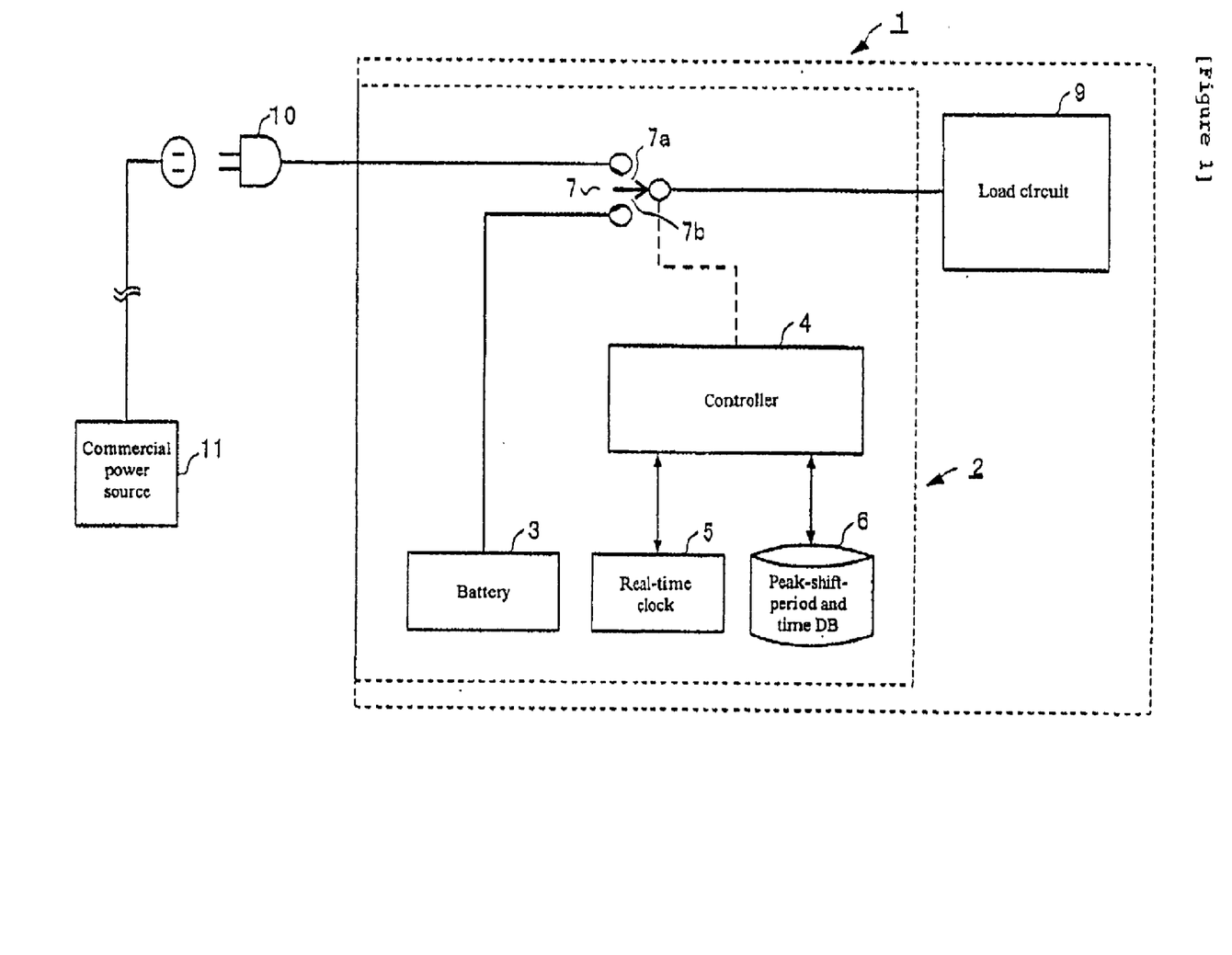
FIG. 1 is a block diagram showing an electrical apparatus of a first embodiment of the present invention.

FIG. 1 is a block diagram showing an electrical apparatus 1 of first embodiment. The electrical apparatus 1 of the first embodiment comprises a power supply system 2 and a load circuit 9. Moreover, in the case of the electrical apparatus 1, the power of a battery 3 comprises the power supply system 2 or the power of an external commercial power source 11 is selectively supplied to the load circuit 9.

The power supply system 2 comprises a battery 3, a controller 4, a real time clock 5, a peak shift period and time database DB 6, and a switch 7. The battery 3 can also include a rechargeable secondary battery such as a nickel metal hydoride battery or lithium ion battery. The battery 3 can be also charged by taking out the battery 3 from the power supply system 2 and setting it to an external battery charger or charged by the battery charger while the battery 3 receives power from the commercial power source 11 by setting the battery charger in the power supply system 2 (not illustrated in FIG. 1). Moreover, when a battery charger having a switching function is built in, the controller 4 can instruct a battery charger to charge the battery 3 by the power of the commercial power source 11 when the capacity of the battery 3 is smaller than a predetermined value and to end charging of the battery 3 when the capacity of the battery 3 reaches a predetermine value or more.

The controller 4 selectively supplies the power of the battery 3 or the commercial power source 11 to the load circuit 9 through the switch 7 by instructions. The controller 4 can comprise, for example, a CPU and a memory for storing a predetermined program. The controller 4 connects with the real time clock 5 and peak shift period and time DB 6. The real time clock 5 is a clock provided with a date mechanism for properly updating the present date (day and month) and time. The peak shift period and time DB 6 stores and sets a date and time (peak start time, peak end time, or peak time; hereafter referred to as information about peak shift period) for stopping the supply of the power of the commercial power source 11 to the load circuit 9. The switch 7 operates so as to selectively supply the power of the commercial power source 11 to the load circuit 9 in accordance with the instruction from the controller 4.

To selectively supply the power of the commercial power source 11 to the load circuit 9, it is necessary that a power source plug 10 serving as power receiving unit is connected to the commercial power source 11. In the case of the electrical apparatus 1, the switch 7 operates so that the power of the commercial power source 11 is supplied to the load circuit 9 in principle when the power source plug 10 is connected to the commercial power source 11. The load circuit 9 includes a device to be operated by power. That is, the load circuit 9 can include one or more units for consuming power.

Operation of the electrical apparatus 1 are described below. In this case, it is assumed that the power source plug 10 is connected to the commercial power source 11. Therefore, the switch 7 keeps the state of 7a as an initial state so as to turn on a power supply line of the commercial power source 11.

The controller 4 obtains the present date and time from the real time clock 5. Moreover, the controller 4 obtains the information about a peak shift period from the peak shift and time DB 6. The controller 4 determines whether the present corresponds to a peak shift period by comparing the obtained present date and time with the information about the peak shift period.

When the controller 4 determines that the present is a peak shift period, it instructs the switch 7 to supply the power of the battery 3 to the load circuit 9. The switch 7 switches from the state of 7a to the state of 7b in accordance with the instruction from the controller 4. That is, the switch 7 stops the supply of the power of the commercial power source 11 to the load circuit 9 and operates so as to supply the power of the battery 3 to the load circuit 9. The controller 4 continuously compares the obtained present date and time with the information about a peak shift period and keeps the switch 7 in the state of 7b for a predetermined time zone in which the controller 4 determines that the present is the peak shift period. When the predetermined time zone passes, the controller 4 instructs the switch 7 to return to the state of 7a from the state of 7b.

Moreover, when the controller 4 determines that the present is out of the peak shift period, it instructs the switch 7 to keep the state of 7a.

The electrical apparatus 1 sets the date and time in which the power consumption of the commercial power source 11 peaks through a year to the peak shift period and time DB 6. Specifically, the apparatus 1 sets the period between 1:00 and 4:00 PM from July 1 through September 30 in summer to the peak shift period and time DB 6. Then, the electrical apparatus 1 stops the supply of the power of the commercial power source 11 in a predetermined time zone in which the power consumption of the commercial power source 11 peaks. Therefore, it is possible to contribute to the peak shift of power consumption. Moreover, because the power of the battery 3 is supplied to the load circuit 9 in the above time zone, the essential function of the electrical apparatus 1 is not deteriorated.

Second Embodiment

A second embodiment of the present invention is described below by referring to the accompanying drawings. The second embodiment is assumed that the present invention is configured as a notebook type PC.

Figure 2:
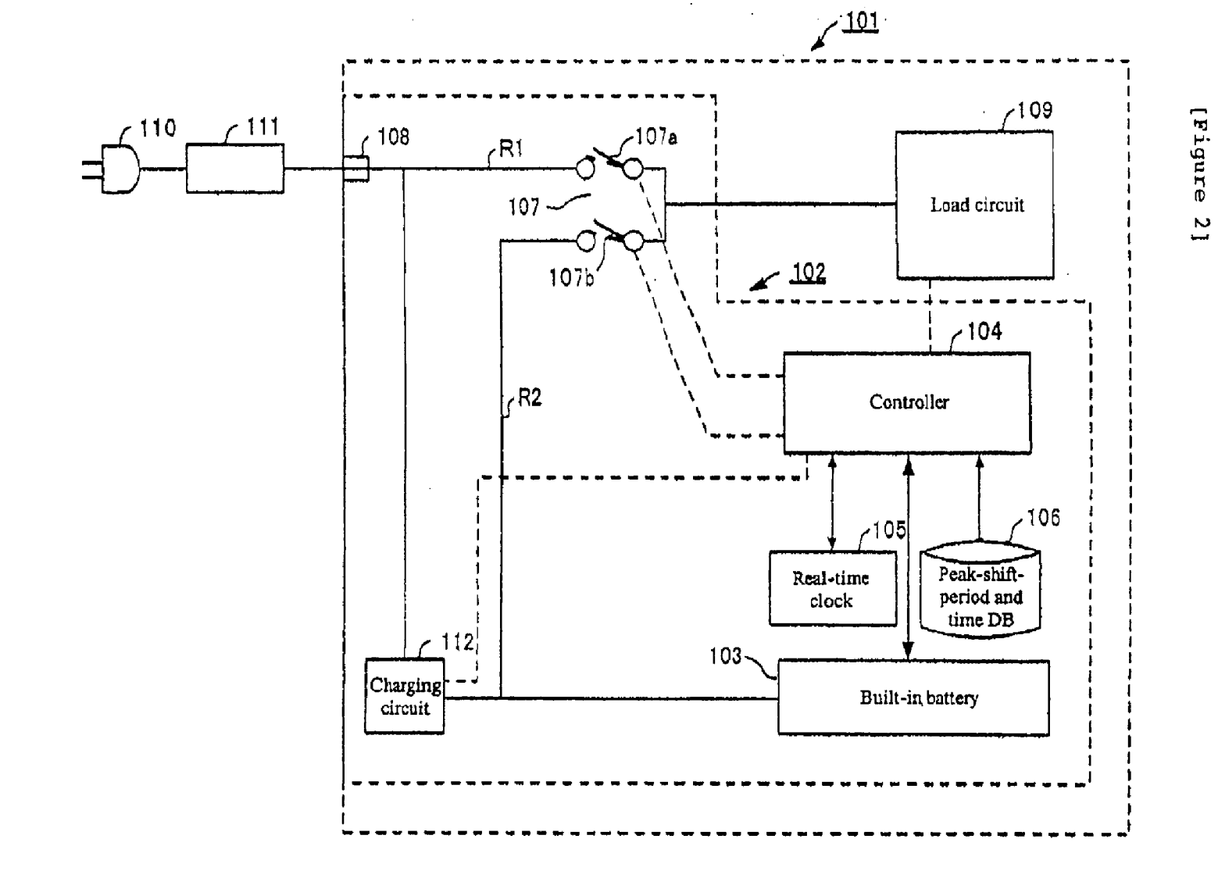
FIG. 2 is a block diagram showing an electrical apparatus of a second embodiment of the present invention.

FIG. 2 is a block diagram showing a notebook type PC 101 according to the second embodiment. As shown in FIG. 2, the notebook type PC 101 comprises a power supply system 102 and a load circuit 109.

The power supply system 102 is provided with a built in battery 103, a controller 104, a real time clock 105, a peak shift period and time DB 106, a switch 107, a connector 108, and a charging circuit 112. Contents of the built in battery 103, real time clock 105, and peak shift period and time DB 106 are the same as those of the battery 3, real time clock 5, and peak shift period and time DB 6 of the first embodiment.

The controller 104 selectively supplies the power of the built in battery 103 or a commercial power source (not illustrated) to the load circuit 109 through the switch 107 by instructions. The controller 104 has a function of checking the remained capacity of the built in battery 103. Additionally, the controller 104 can also perform various controls in accordance with the fact that the power of a commercial power source is used (commercial power source mode) or the power of the built in battery 103 is used (battery mode). For example, when the remaining capacity of a battery is equal to or less than a predetermined value in the commercial power source mode, it is possible to instruct the charging circuit 112 to start charging the built in battery 103. Moreover, in the battery mode, it is possible to instruct a display controller serving as a part of the load circuit 109 to lower a panel brightness or to stop the supply of power to a CPU, an HDD, or a display unit when the notebook type PC 101 is not operated for a certain period.

The switch 107 selectively supplies the power of the built in battery 103 or a commercial power source to the load circuit 109 in accordance with the instruction from the controller 104. The switch 107 comprises a first switch 107a and a second switch 107b. It is preferable to use an FET switch for the first switch 107a and the second switch 107b when applying the present invention to the notebook type PC 101.

The power supply system 102 is provided with the connector 108 for connecting with an AC adapter 111. By connecting the AC adapter 111 to the connector 108 and the power source plug of the AC adapter 111 to a commercial power source, it is possible to supply the power of the commercial power source to the load circuit 109 through the switch 107. The power supply system 102 is set so that the first switch 107a of the switch 107 is turned on (dotted line in FIG. 2) and the second switch 107b is turned off (solid line in FIG. 2) in principle when the AC adapter 111 is connected to a commercial power source and the connector 108.

As shown in FIG. 2, the path between the AC adapter 111 and the switch 107 forms a first power supply line R1 for supplying the power of a commercial power source to the load circuit 109. Moreover, the path between the built in battery 103 and the switch 107 forms a second power supply line R2 for supplying the power of the built in battery 103 to the load circuit 109. A path between the switch 107 and the load circuit 109 forms the first power supply line R1 or the second power supply line R2 in accordance with the operation of the switch 107.

The charging circuit 112 is set between the connector 108 and the built in battery 103. The charging circuit 112 functions so as to control charging of the built in battery 103 by the power of a commercial power source. A specific charging mode will be described later.

The load circuit 109 includes devices to be operated by power such as a HDD (Hard Disk Drive) and an LCD (liquid crystal display). However, the illustration is not intended to be so restrictive or limiting for the present invention.

Power supply operations of the notebook type PC 101 are described below by referring to the flowchart shown in FIG. 3. In this case, it is assumed that the AC adapter 111 is connected to the connector 108 and the power source plug 110 of the AC adapter 111 is connected to a commercial power source.

Figure 3:
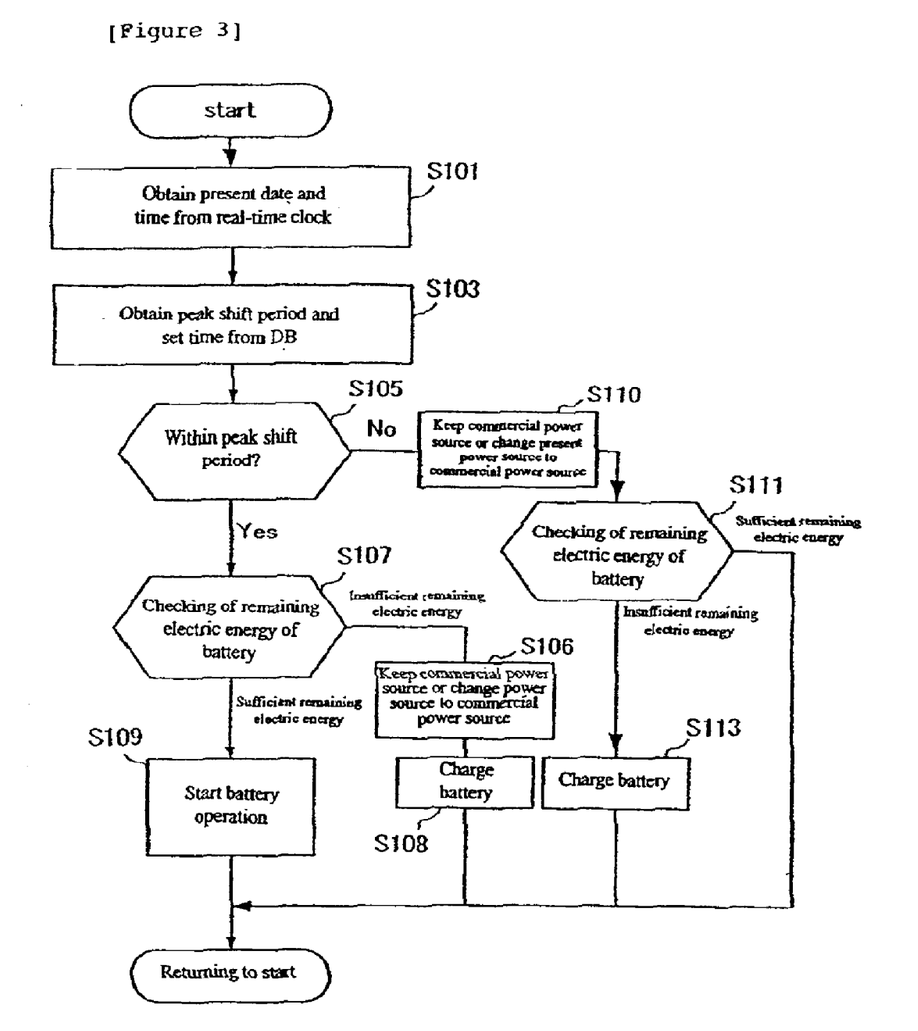
FIG. 3 is a flowchart showing a power supply method of the second embodiment of the present invention.

The controller 104 obtains the present date and time from the real time clock 105 (S101 in FIG. 3). Then, the controller 104 obtains the information about a peak shift period from the peak shift period and time DB 106 (S103 in FIG. 3). The controller 104 determines whether the present corresponds to a peak shift period by comparing the obtained present date and time with the information about a peak shift period (S105 in FIG. 3).

When determining that the present date and time correspond to the peak shift period, the controller 104 checks the remaining electric energy of the built in battery 103 (S107 in FIG. 3). When the built in battery 103 has a sufficient remaining electric energy equal to or more than a predetermined value, the controller 104 stops the supply of the power of a commercial power source while starting the battery operation for supplying the power of the built in battery 103 to the load circuit 109 (S109 in FIG. 3). Specifically, the controller 104 instructs the switch 107 to turn off the first switch 107a in the first power supply line R1 (solid line in FIG. 2) and turn on the second switch 107b in the second power supply line R2 (dotted line in FIG. 2). In this case, to avoid supply of power to the load circuit 109 from being completely stopped, it is necessary to pass through the operation process of turning on the second switch 107b while the first switch 107a is turned on and then turning off the first switch 107a.

However, when the built in battery 103 has only an insufficient amount of electricity less than the predetermined value, the power of the commercial power source is continuously supplied to the load circuit 109 without starting the battery operation to charge the built in battery 103 (S106 and S108 in FIG. 3). The routine for the performance of these operations is executed not only when the remaining electric energy in the battery is almost equal to zero but also when the battery operation is started and thereby, the remaining electric energy in the battery becomes equal to or less than a predetermined value. Moreover, it is possible to delay charging of the built in battery 103 (S108) so as to be performed after a peak period ends. After these processings are completed, a series of processings starting with S101 is executed.

When it is determined that the present date and time do not correspond to a peak shift period, supply of power from a commercial power source is kept or a power source is changed to a commercial power source (S110 in FIG. 3). This case is originally out of a peak period, which includes the situation of keeping supply of power from a commercial power source and the case in which the present time gets out of a peak period in accordance with the elapse of time after the battery operation is started (S109 in FIG. 3).

Then, the controller 104 checks the remaining electric energy of the built in battery 103 (S111 in FIG. 3). When the built in battery 103 has a remaining electric energy equal to or more than a predetermined value, the power of the commercial power source is continuously supplied to the load circuit 109. However, when the built in battery 103 has only an insufficient remaining electric energy less than the predetermined value, the built in battery 103 is charged (S113 in FIG. 3). Thereafter, a series of processing starting with S101 is executed.

Figure 4:
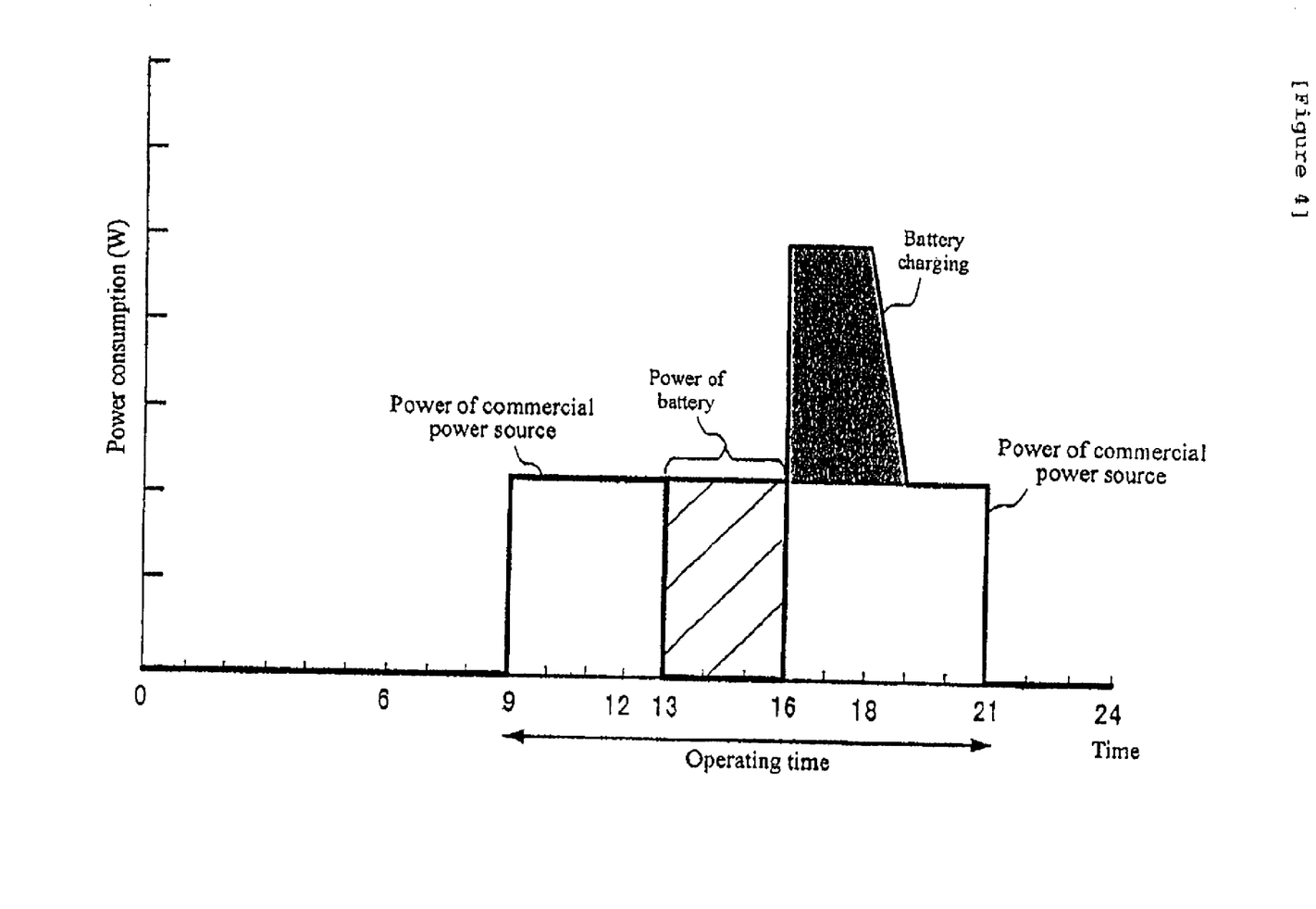
FIG. 4 is a graph showing a power consumption pattern of the electrical apparatus of the second embodiment of the present invention.
Figure 5:
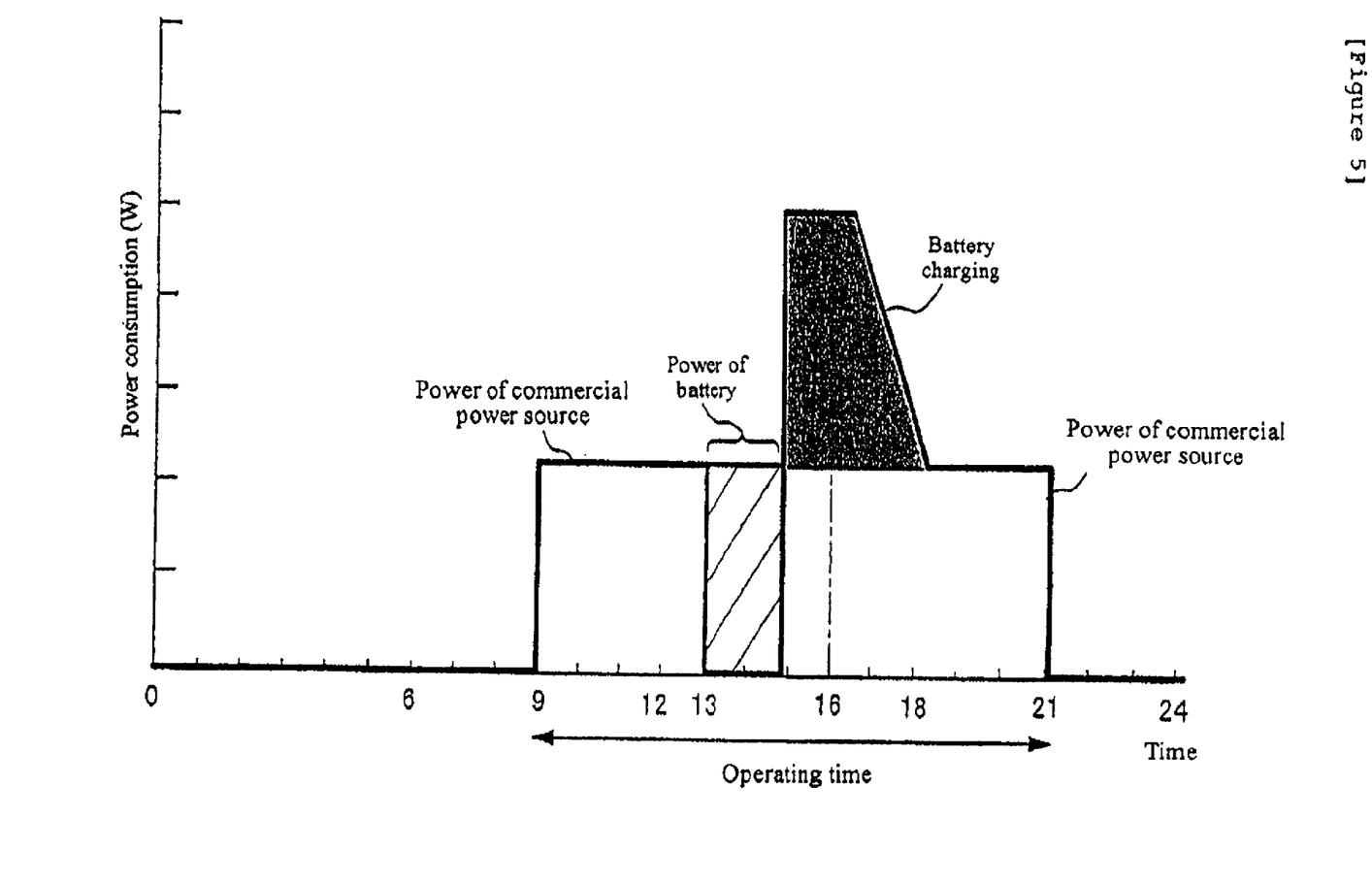
FIG. 5 is a graph showing a power consumption pattern of the second embodiment of the present invention.
Figure 6:
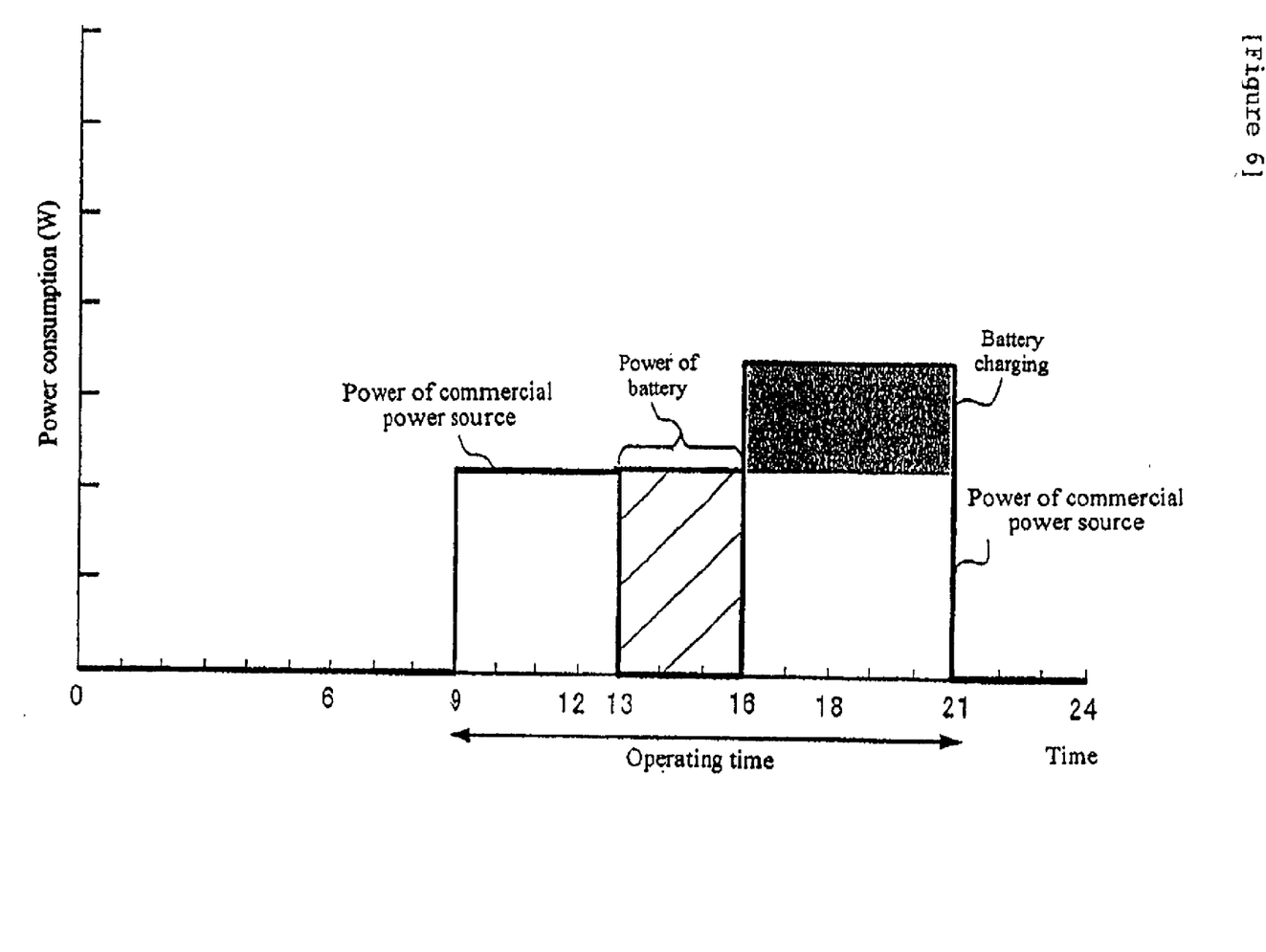
FIG. 6 is a graph showing a power consumption pattern of the second embodiment of the present invention.

Operations of the notebook type PC 101 are generally described above and incorporated hereinafter. Power consumption patterns per day of the notebook type PC 101 are described below in accordance with several examples. FIGS. 4 to 6 are graphs illustrating power consumption patterns per day of the notebook type PC 101. In FIGS. 4 to 6, y axis indicates power consumption (W) and x axis indicates time (0:00 to 24:00). Moreover, in FIGS. 4 to 6, the notebook type PC 101 for business is assumed and it is assumed that the PC 101 is operated in the time zone between 9:00 (9:00 am) and 21:00 (9:00 PM).

As shown in FIG. 4, the switch of the notebook type PC 101 is turned on at 9:00. Then, the power of a commercial power source is supplied to the load circuit 109 of the notebook type PC 101. In this case, even if the built in battery 103 has a sufficient remaining electric energy, the power of the commercial power source is supplied to the load circuit 109. Supply of the power of the commercial power source to the load circuit 109 is continued up to 13:00 (1:00 PM). At 13:00, power supply by the built in battery 103 is started and power supply by the commercial power source is stopped (hatched portion in FIG. 4). Power supply from the built in battery 103 to the load circuit 109 is continued up to 16:00. That is, the notebook type PC 101 has a peak shift function and is able to compensate stop of power supply by a commercial power source due to peak shift with the power of the built in battery 103. Power supply by the commercial power source is restarted from 16:00 and power supply by the built in battery 103 is stopped. At 16:00, it is determined that the remaining electric energy of the built in battery 103 is insufficient, charging of the built in battery 103 is immediately started. In FIG. 4, the blackened protruded portion shows an electric energy supplied from a commercial power source to charge the bb 103. FIG. 4 shows an example of completing charging in a predetermined short time by the maximum charging capacity. Therefore, the electric energy supplied from the commercial power source to charge the built in battery 103 shows a protruded form as shown in FIG. 4. However, the power of the commercial power source is supplied to the load circuit 109 in the time zone from 16:00 up to 21:00 in which the notebook type PC 101 is operated. At 21:00, the power source of the notebook type PC 101 is turned off and therefore, the electric energy supplied from the commercial power source to the load circuit 109 becomes zero.

The example in FIG. 4 shows a case in which the built in battery 103 has a sufficient remaining electric energy in the time zone between 13:00 and 16:00 which is the time set to the peak shift period and time DB 106. However, the remaining electric energy of the built in battery 103 may be insufficient (including zero) in the time zone between 13:00 and 16:00. In this case, even before 16:00, power supply by the commercial power source is restarted and power supply by the built in battery 103 is stopped as shown in FIG. 5.

Power consumption patterns shown in FIGS. 4 and 5 show examples of charging the built in battery 103 by using the maximum charging capacity after 16:00. For example, as shown in FIG. 6, it is also possible to charge the built in battery 103 by equalized power. The example shown in FIG. 6 coincides with the examples shown in FIGS. 4 and 5 in that charging of the built in battery 103 is started at and after 16:00. However, in the case of the example shown in FIG. 6, the maximum charging capacity is not used. Therefore, the power consumption by the commercial power source is not protruded. When carrying the notebook type PC 101 to a going out destination, charging patterns shown in FIGS. 4 and 5 are preferable. However, when the PC 101 is not carried to a going out destination, the charging pattern shown in FIG. 6 is preferable.

Figure 7:
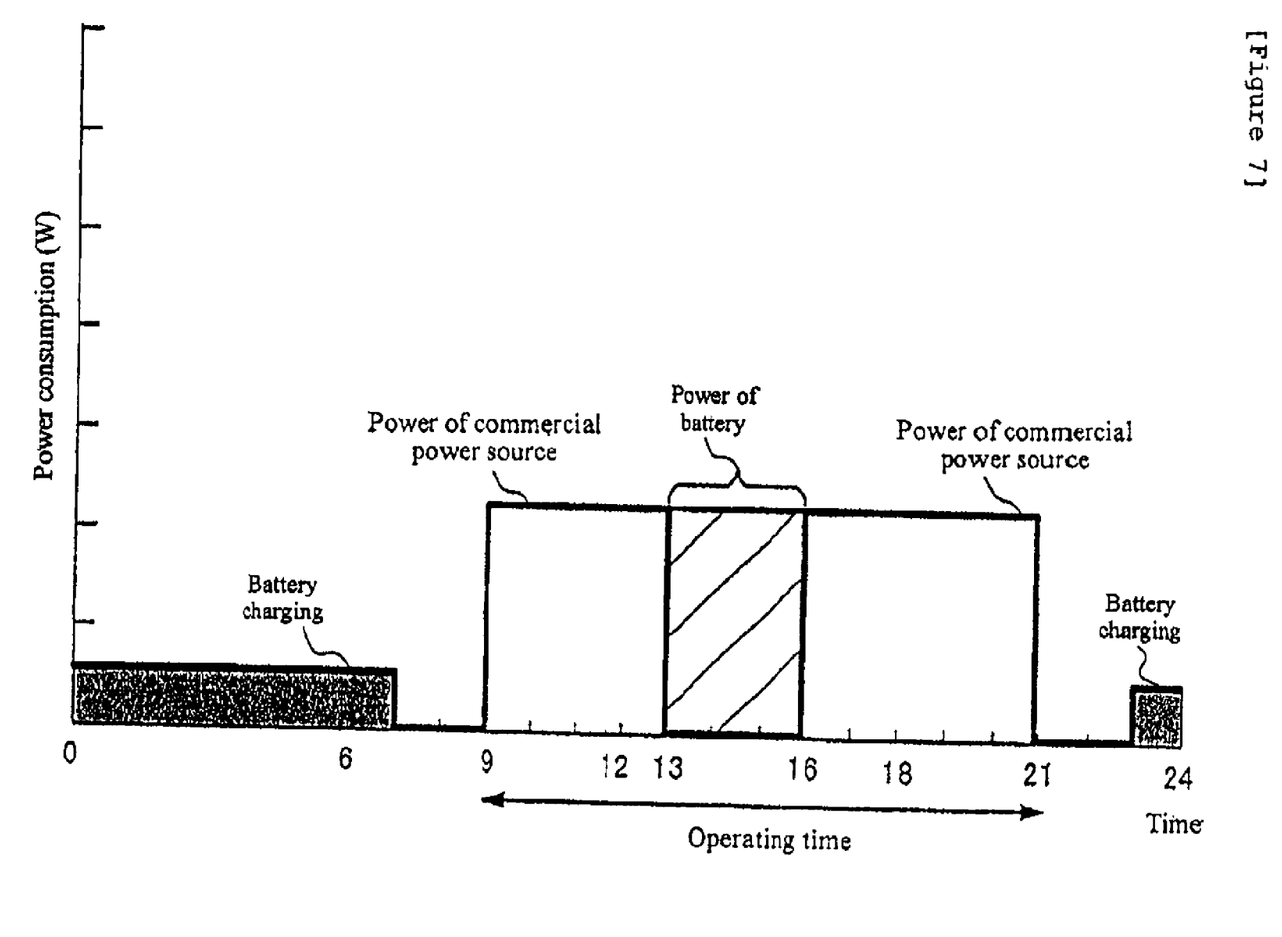
FIG. 7 is a graph showing a power consumption pattern of the second embodiment of the present invention.

In the case of the power consumption patterns shown in FIGS. 4 to 6, the built in battery 103 is charged within the time of using the notebook type PC 101. However, it may not be necessary to charge the PC 101 in the above time zone. It is also possible to charge the built in battery 103 in a time zone in which the power consumption of a commercial power source is small, specifically a time zone between midnight and early morning. The time zone between midnight and early morning is effective to operate the notebook type PC 101 in an office because the electricity rate is low in the time zone. For example, as shown in FIG. 7, it is also possible to charge the notebook type PC 101 for 8 hours from 23:00 (11:00 PM) at which the operation of the notebook type PC 101 is completed up to 7:00 (7:00 am). In the case of this pattern, an advantage is also obtained that it is possible to decrease power consumption because charging uses a long time.

Third Embodiment

A third embodiment of the present invention is described below by referring to FIG. 8, however the present invention is not so limited thereto.

The above described second embodiment purposes the notebook type PC 101 provided with the built in battery 103. However, the present invention can be applied to an electrical apparatus excluding a battery such as a desk top type PC, a server, or a host machine under a predetermined condition. For example, a case of supplying power to a desk top type PC or the like through a power supply system provided with a battery corresponds to the above predetermined condition.

Figure 8:
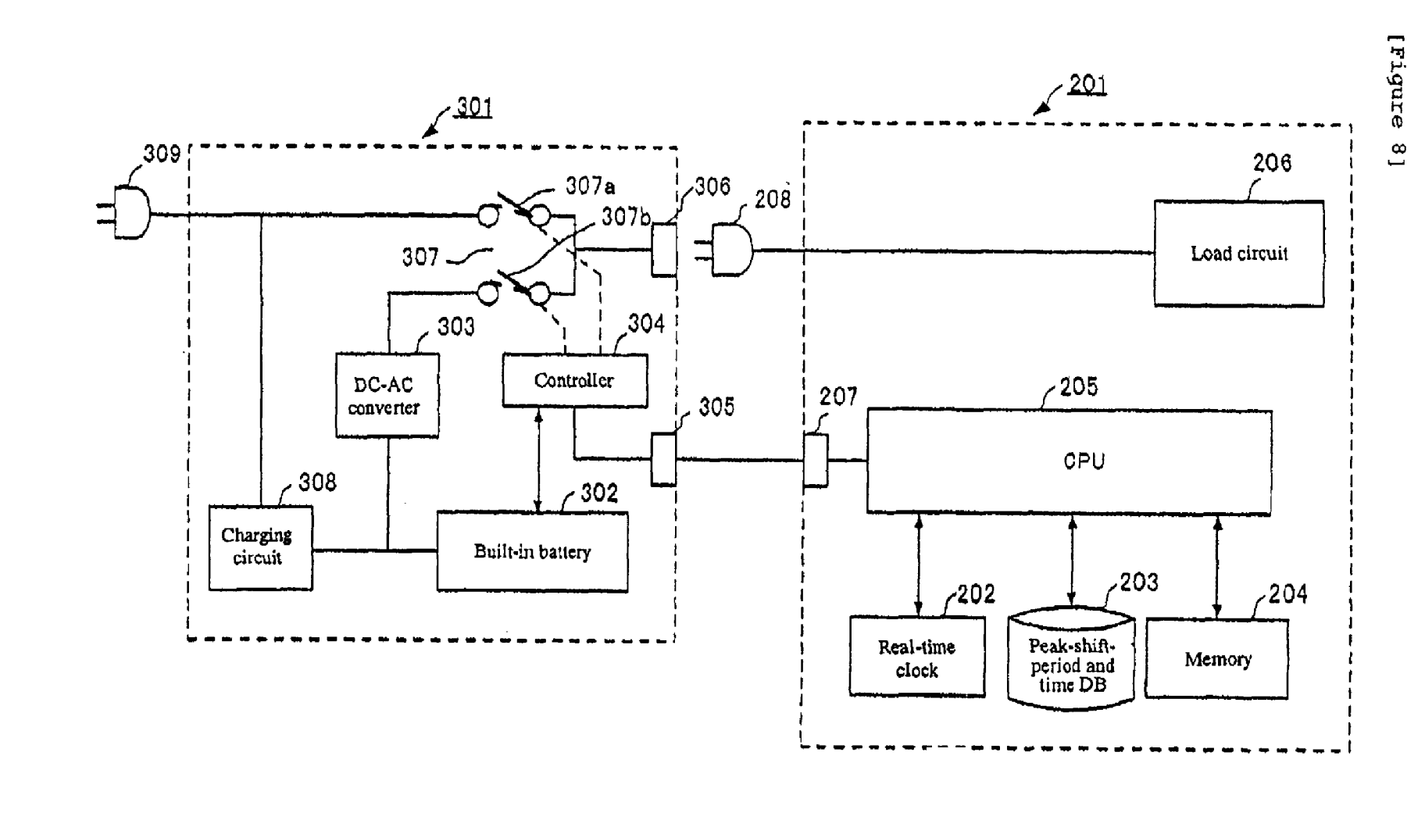
FIG. 8 is a block diagram showing a electrical apparatus of a third embodiment of the present invention.

FIG. 8 is a block diagram showing a configuration of a computer system according to the third embodiment. The computer system is constituted of a desk-top-type PC 201 and an external power supply system 301. The desk-top type PC 201 is provided with a real-time clock 202, a peak-shift-period and time DB 203, a memory 204, a CPU (Central Processing Unit) 205, and a toad circuit 206. Contents of the real-time clock 202 and peak-shift-period and time DB 203 are the same as those of the real-time clock 5 and peak-shift-period and time DB 6. The memory 204 stores a predetermined program and the CPU 205 interprets and executes the program stored in the memory 204. The program instructs the operation for selecting the power to be supplied from the external power supply system 301 to the desk-top-type PC 201, as described later. The CPU 205 connects with an interface 207 for supplying a signal to the exterior and the load circuit 206 connects with a power-source plug 208 serving as unit for receiving the external power. The load circuit 206 includes a device to be operated by power such as a HDD (Hard Disk Drive) or the like as described above.

The external power supply system 301 selectively supplies the power of a commercial power source connected through the power source plug 309 or a built in battery 302 to the desk top type PC 201. Moreover, the external power supply system 301 is provided with the built in battery 302, a DC AC converter 303, a controller 304, an interface 305, a plug socket 306, a switch 307, a charging circuit 308, and a power source plug 309.

The controller 304 operates the switch 307 in accordance with the instruction transferred from the CPU 205 of the desktop type PC 201 through the interface 305. That is, to supply the power of a commercial power source to the desk top type PC 201, the controller 304 turns on a first switch 307*a* (dotted line in FIG. 8) and turns off a second switch 307*b* (solid line in FIG. 8). Moreover, to supply the power of the built in battery 302 to the desk top type PC 201, the controller 304 turns off the first switch 307*a* (solid line in FIG. 8) and turns on the second switch 307*b* (dotted line in FIG. 8). The power of the built in battery 302 is supplied through the DC AC converter 303.

The charging circuit 308 is set between the power source plug 309 and the built in battery 302. The charging circuit 308 has a function of controlling charging of the built in battery 302 using the power of a commercial power source.

The following are operations for power supply when the power source plug 309 of the external power supply system 301 is connected to a commercial power source and the power source plug 208 of the desk top type PC 201 is connected to the plug socket 306 of the external power supply system 301.

The CPU 205 obtains the present date and time from the real time clock 202. Then, the CPU 205 obtains the information about a peak shift period from the peak shift period and time DB 203. The CPU 205 determines whether the present corresponds to a peak shift period by comparing the obtained present date and time with the information about a peak shift period.

When it is determined that the present date and time correspond to the peak shift period, the CPU 205 instructs the controller 304 of the external power supply system 301 to check the remaining electric energy of the built in battery 302. When the built in battery 302 has a remaining electric energy equal to or more than a predetermined value, the controller 304 instructs the switch 307 to turn off the first switch 307*a* and turn on the second switch 307*b*. That is, switching to the battery operation is accomplished.

However, when the built in battery 302 has only an insufficient remaining electric energy less than the predetermined value, the controller 304 supplies the power of a commercial power source to the load circuit 206 of the desk top type PC 201 without changing the present operation to the battery operation. Specifically, the controller 304 instructs the switch 307 to keep states of turning on the first switch 307*a* and turning off the second switch 307*b* in accordance with the instruction of the CPU 205.

When determining that the present date and time does not correspond to the peak shift period, the CPU 205 instructs the controller 304 to check the remaining electric energy of the built in battery 302. When the built in battery 302 has a sufficient remaining electric energy equal to or more than a predetermined value, it continuously supplies the power of a commercial power source to the load circuit 206 of the desk top type PC 201. However, when the built in battery 302 has only an insufficient remaining electric energy less than the predetermined value, the CPU 205 charges the built in battery 302.

Similarly, the power consumption patterns shown in FIGS. 4 to 6 are also applicable to the third embodiment.

By setting the date and time to be set to the peak shift period and time DB 203 to the period between 1:00 and 4:00 PM from July 1 through September 30 in summer in the above computer system similarly to the case of the first and second embodiments, it is possible to contribute to peak shift of power consumption. Moreover, because the power of the built in battery 302 is supplied to the load circuit 206 in the above time zone, the essential function of the desk top type PC 201 is not deteriorated. Furthermore, it is possible to make the external power supply system 301 of the third embodiment function as a UPS (Uninterruptible Power Supply). The built in battery of the UPS frequently uses a lead acid battery in general. The demand for the UPS is increased mainly for OA equipment as an apparatus for protecting an electrical apparatus such as a PC from a short time power failure or voltage drop by the power stored in a battery or capacitor.

Therefore, it is very significant to add not only the peak shift function but also the function of the UPS to the external power supply system 301. Specifically, when the controller 304 detects a power failure, it is permitted to control the operation of the switch 207 so as to supply the power of the built in battery 302 to the load circuit 206 of the desk top type PC 201.

The present invention is described in accordance with the first to third embodiments. However, the present invention is not restricted to the first, second and third embodiments. For example, a date and time to be set to a peak shift period and time DB are only examples. It is possible to set other date and time. Moreover, for the second and third embodiments, a PC is shown as an electrical apparatus. However, it is possible to apply the present invention to other electrical apparatus. Furthermore, it is permitted to use an electrical apparatus including a battery or an electrical apparatus excluding a battery as the above electrical apparatus.

What is claimed is:

1. A power supply system comprising:
a secondary battery for supplying power to a load circuit, a power receiving unit for receiving power externally provided to the load circuit;

a switch for selectively supplying the power of the secondary battery or the power externally provided to the load circuit;

a clock and date mechanism providing real time and date information;

a memory storing information relative to a peak shift period for stopping supply of the power externally provided; and a controller correlating information from the clock and date mechanism and memory to instruct the switch, based upon a result of the correlation, to stop the supply of the power externally provided to the load circuit for a predetermined time interval.

2. The power supply system according to claim 1, wherein the controller instructs the switch to stop the supply of the power externally provided to the load circuit in the predetermined time interval even when the source of the power externally provided is electrically connected with the power receiving unit.

3. The power supply system according to claim 2, wherein the controller instructs the switch to supply the power of the secondary battery to the load circuit in the predetermined time interval.

4. The power supply system according to claim 3, wherein the controller instructs the switch to supply the power externally provided to the load circuit after the predetermined time interval passes.

5. The power supply system according to claim 4, further comprising a battery charger, wherein the controller instructs the battery charger to charge the secondary battery by using the power eternally provided after the predetermined time interval passes.

6. A power supply method for selectively supplying the power of a commercial power source or a battery to a load circuit, comprising:

providing a clock and date mechanism to generate real time and date information;

storing in a memory information relative to peak shift intervals for stooping supply of power from the commercial power source;

supplying the power of the battery to the load circuit in a predetermined time interval decided in accordance with the power consumption of the commercial power source;

correlating with a controller information from the clock and date mechanism with information from the memory; and based upon results of the correlation, supplying the power of the commercial power source to the load circuit in a time interval except the predetermined time interval.

7. The power supply method according to claim 6, wherein the predetermined time interval is decided in accordance with a time interval in which the power consumption of the commercial power source shows a peak.

8. The power supply method according to claim 7, wherein the time interval in which the power consumption shows the peak lies between 1:00 and 4:00 PM.

9. An electrical apparatus comprising:

a device to be operated by power of the battery or commercial power source; and a control unit including a real-time clock mechanism and peak-shift period and time date base for controlling whether to preferentially supply the power of the battery or the power of the commercial power source to the device in accordance with a temporal factor.

10. The electrical apparatus according to claim 9, further comprising a power receiving unit for receiving the power of an external commercial power source for the device, wherein the control unit instructs a time zone for supplying the power of the battery to the device preferentially to the power of the commercial power source when the commercial power source is connected to the power receiving unit.

11. The electrical apparatus according to claim 9, wherein the battery is built in the electrical apparatus.

12. An electrical apparatus comprising:

a device to be operated by receiving power;

a power receiving unit for receiving the power of an external commercial power source for the device;

a first power-supply line for supplying the power of the commercial power source received by the power receiving unit to the device;

a built in battery for supplying power to the device;

a second power-supply line for supplying the power of the built-in battery to the device; and a switching mechanism for turning off the first power-supply line and turning on the second power-supply line when the commercial power source is connected to the power receiving unit, and a predetermined condition including a match of current time and date with a predefined time and date, is satisfied.

13. The electrical apparatus according to claim 12, wherein the predetermined condition is set in accordance with a season and a time.

14. An electrical apparatus provided with a device to be operated by the power of a built-in battery or a commercial power source, comprising:

a switching mechanism for determining whether to supply the power of the built-in battery or the power of the commercial power source to the device; and a controller for instructing the switching mechanism to supply the power of the built-in battery to the device when the remained capacity of the built-in battery is equal to or more than a predetermined value and supply the power of the commercial power source to the device when the remained capacity of the built-in battery is less than the predetermined value.

15. The electrical apparatus according to claim 14, further comprising:

a battery charger for charging the built-in battery by the power of the commercial power source, wherein the controller instructs the battery charger to charge the built-in battery in any time interval other than a specified predetermined time interval.

16. The electrical apparatus according to claim 14, wherein the electrical apparatus is a portable computer system.

17. The electrical apparatus of claim 14 wherein the device includes a portable computer system.

18. The electric apparatus of claim 14 wherein the controller includes an embedded micro-controller.

19. A power supply method for an electrical apparatus provided with a device to be operated by the power of a built-in battery or a commercial power source, comprising:

identifying an occurrence of a first time interval by comparing a current time and date with a predefined time and date;

supplying the power of the built-in battery to the device in the first time interval decided in accordance with the power consumption of the commercial power source;

supplying the power of the commercial power source to the device in a second time interval except the first time interval; and charging the built-in battery by the commercial power source in the second time interval.

20. The power supply method according claim 19, wherein charging of the built in battery by the commercial power source in the second time interval is performed by using the maximum charging capacity after the first time interval passes.

21. The power supply method according to claim 19, wherein charging of the built-in battery by the commercial power source in the second time interval is performed by equalized electric energy after the first time interval passes.

22. The power supply method according to claim 19, wherein charging of the built-in battery by the commercial power source in the second time interval is performed in a time interval in which the power consumption of the commercial power source is small in the second time interval.

* * * * *